United States Patent
Brun

(10) Patent No.: US 8,470,168 B2
(45) Date of Patent: Jun. 25, 2013

(54) HEAT EXCHANGER SYSTEM

(75) Inventor: Gilles Brun, Paris (FR)

(73) Assignee: SNECMA, Paris (FR)

( * ) Notice: Subject to any disclaimer, the term of this patent is extended or adjusted under 35 U.S.C. 154(b) by 230 days.

(21) Appl. No.: 12/920,182

(22) PCT Filed: Feb. 27, 2009

(86) PCT No.: PCT/FR2009/050322
§ 371 (c)(1),
(2), (4) Date: Nov. 30, 2010

(87) PCT Pub. No.: WO2009/112779
PCT Pub. Date: Sep. 17, 2009

(65) Prior Publication Data
US 2011/0061835 A1    Mar. 17, 2011

(30) Foreign Application Priority Data
Feb. 29, 2008    (FR) .................................. 08 51315

(51) Int. Cl.
*B01D 35/147*   (2006.01)
(52) U.S. Cl.
USPC ......... 210/130; 210/175; 210/251; 210/433.1
(58) Field of Classification Search
None
See application file for complete search history.

(56) References Cited

U.S. PATENT DOCUMENTS

| | | | | |
|---|---|---|---|---|
| 511,798 A * | 1/1894 | Rankine | ......................... | 210/130 |
| 2,729,339 A * | 1/1956 | McCoy | .......................... | 210/90 |
| 3,469,697 A * | 9/1969 | Kudlaty | ........................ | 210/132 |
| 3,487,931 A * | 1/1970 | Paulson | ........................ | 210/130 |
| 3,853,763 A * | 12/1974 | Hall | .............................. | 210/130 |
| 3,970,566 A * | 7/1976 | Rosaen | ......................... | 210/452 |
| 4,529,518 A * | 7/1985 | Jackson | ........................ | 210/407 |
| 4,638,856 A * | 1/1987 | Yamanaka et al. | ............ | 165/119 |
| 4,645,591 A * | 2/1987 | Gerulis | ......................... | 210/108 |
| 5,014,775 A * | 5/1991 | Watanabe | ..................... | 165/167 |
| 5,122,264 A * | 6/1992 | Mohr et al. | ................... | 210/111 |
| 5,207,358 A * | 5/1993 | Bisker | ...................... | 222/189.06 |
| 5,481,876 A * | 1/1996 | Bay et al. | ........................ | 60/454 |
| 5,575,329 A * | 11/1996 | So et al. | ........................ | 165/167 |
| 5,600,954 A * | 2/1997 | Bay et al. | ........................ | 60/454 |
| RE35,564 E * | 7/1997 | Gerulis | ......................... | 210/108 |
| 5,906,221 A * | 5/1999 | Mancell | ........................ | 137/549 |
| 6,269,835 B1 * | 8/2001 | Kochsmeier | ................. | 137/549 |
| 6,475,380 B1 * | 11/2002 | Fangmann et al. | ........... | 210/120 |
| 6,584,777 B1 | 7/2003 | Clarke | | |
| 6,605,210 B2 * | 8/2003 | Reinhardt | .................... | 210/130 |

(Continued)

FOREIGN PATENT DOCUMENTS

EP    1 061 243    12/2000

*Primary Examiner* — Robert James Popovics
(74) *Attorney, Agent, or Firm* — Oblon, Spivak, McClelland, Maier & Neustadt, L.L.P.

(57) ABSTRACT

A heat exchanger system through which a liquid can flow, including a heat exchanger including a liquid inlet and a liquid outlet, a bypass valve including a liquid inlet and a liquid outlet, and a self-cleaning filter including a liquid inlet and two liquid outlets, one being an outlet for filtered liquid and one being an outlet for non-filtered liquid. The outlet for filtered liquid is connected to the inlet of the exchanger and the outlet for non-filtered liquid is connected to the inlet of the valve. The outlet of the heat exchanger is connected downstream of the outlet of the valve. A fuel circuit of an airplane jet engine can include such a system.

9 Claims, 2 Drawing Sheets

U.S. PATENT DOCUMENTS

| | | | |
|---|---|---|---|
| 6,613,220 B2* | 9/2003 | Golovatai-Schmidt | 210/130 |
| 6,858,134 B2* | 2/2005 | Yates | 210/167.01 |
| 6,994,784 B2* | 2/2006 | Jainek | 210/149 |
| 7,094,343 B2* | 8/2006 | Moessinger et al. | 210/298 |
| 7,094,344 B2* | 8/2006 | Shirakawa et al. | 210/301 |
| 7,166,210 B2* | 1/2007 | Smith | 210/132 |
| 7,479,219 B2* | 1/2009 | Rassinger | 210/130 |
| 7,967,980 B2* | 6/2011 | Miyachi | 210/172.2 |
| 8,038,872 B2* | 10/2011 | Jokschas et al. | 210/86 |
| 8,057,687 B2* | 11/2011 | Jainek | 210/767 |
| 8,231,779 B2* | 7/2012 | Jokschas et al. | 210/86 |
| 8,231,793 B2* | 7/2012 | Hacker et al. | 210/767 |
| 2001/0027941 A1* | 10/2001 | Assmann | 210/130 |
| 2002/0074272 A1* | 6/2002 | Golovatai-Schmidt | 210/130 |
| 2002/0170852 A1* | 11/2002 | Reinhardt | 210/132 |
| 2004/0011052 A1 | 1/2004 | Clements | |
| 2004/0031745 A1* | 2/2004 | Moessinger et al. | 210/323.2 |
| 2004/0182566 A1* | 9/2004 | Jainek | 165/300 |
| 2005/0103700 A1* | 5/2005 | Shirakawa et al. | 210/301 |
| 2006/0027510 A1* | 2/2006 | Rassinger | 210/790 |
| 2006/0053803 A1 | 3/2006 | Parsons | |
| 2007/0131606 A1* | 6/2007 | Klein et al. | 210/418 |
| 2008/0197064 A1* | 8/2008 | Blasco Remacha et al. | 210/184 |
| 2008/0237152 A1* | 10/2008 | Benachenhou | 210/799 |
| 2009/0236073 A1* | 9/2009 | Jainek | 165/51 |
| 2010/0200485 A1* | 8/2010 | Parra Navarrete et al. | 210/184 |
| 2010/0258491 A1* | 10/2010 | Jokschas et al. | 210/181 |
| 2011/0061835 A1* | 3/2011 | Brun | 165/100 |
| 2012/0006731 A1* | 1/2012 | Swift, Jr. | 210/133 |
| 2012/0006740 A1* | 1/2012 | Swift, Jr. | 210/457 |
| 2012/0037548 A1* | 2/2012 | Jokschas et al. | 210/86 |

* cited by examiner

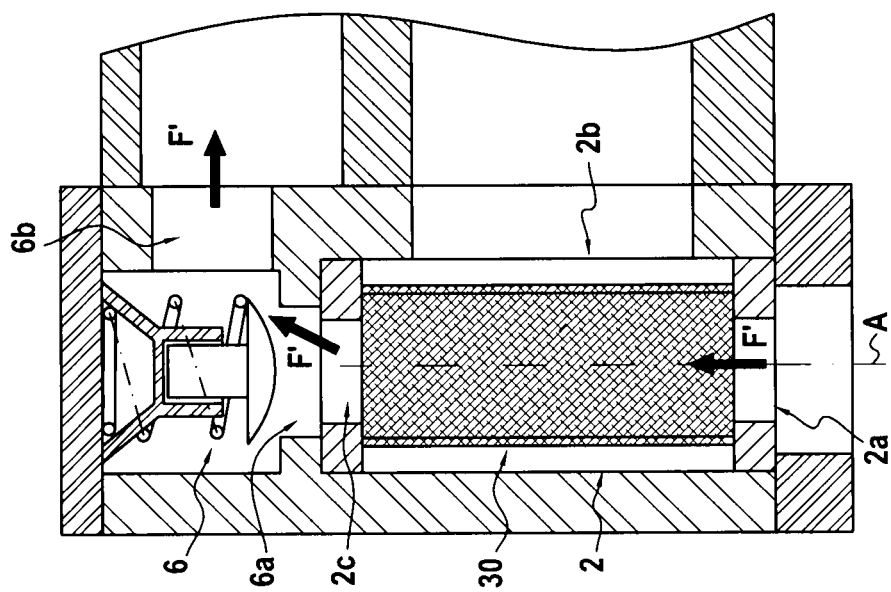
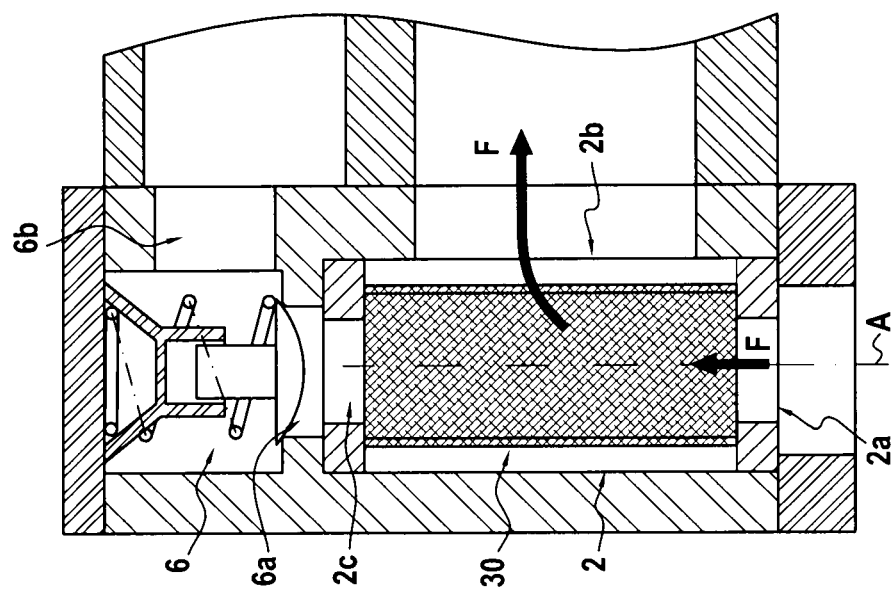

HEAT EXCHANGER SYSTEM

FIELD OF THE INVENTION

The invention concerns a heat exchanger system through which a liquid is intended to flow. Such a system can be mounted in any liquid (i.e. hydraulic) circuit, and in particular a fuel circuit or an oil circuit.

This system can be used, for example, in a fuel circuit of a land or aeronautic turbomachine (jet engine or turbo-prop) and, more particularly, in a fuel circuit of an airplane jet engine.

BACKGROUND OF THE INVENTION

The invention concerns a heat exchanger system through which a liquid is intended to flow, the heat exchanger system being of the type comprising a heat exchanger with a liquid inlet and a liquid outlet. In operation, this heat exchanger is passed through, on one hand, by fuel coming from the airplane's tank, this fuel passing through said liquid inlet and outlet, and, on the other hand, by the oil from the lubrication circuit of the airplane's integrated drive generator (IDG), this oil passing through other liquid inlets and outlets of the exchanger.

Said fuel having a temperature lower than that of the oil (which heats in contact with the IDG), the heat exchanger makes it possible to cool the oil.

The following is focused, more particularly, on the fuel circuit passing through the exchanger.

The clogging of the exchanger, due to the impurities (also called contaminants) present in the fuel, is a dormant breakdown that can occur at any moment after a certain operating time of the jet engine. Partial clogging of the exchanger would cause head losses that could disrupt the proper operation of the elements of the circuit situated downstream from the exchanger, and total clogging of the exchanger would cut the fuel circuit and therefore cause the jet engine to stop.

Among the different known types of heat exchanger that can be used in a jet engine fuel circuit, we distinguish tube exchangers and plate exchangers.

Tube exchangers have a matrix formed by a network of tubes that separate the two liquids passing through the exchanger. The passage section of the tubes must meet feasibility constraints. In other words, below a minimum inner diameter of the tubes, these tubes are too difficult to manufacture. This minimum inner diameter is often clearly greater than the diameter of the impurities present in the fuel, such that the risk of clogging of this type of exchanger remains low, without, however, being nonexistent. However, in order to increase the thermal performance of a tube exchanger, the tubes generally have pins on their inner surfaces. However, these pins catch the impurities and the impurities caught in the pins move and gradually wear the tube down until it becomes perforated. Such a perforation can have dramatic consequences.

Plate exchangers have the advantage of being able to have liquid passage sections smaller than those of tube exchangers, but the smaller the passage sections, the more the risk of clogging increases. Thus, plate exchangers are used little, if at all, in jet engine fuel circuits today.

Regardless of the type of exchanger used, it is preferable not to have to monitor the clogging of the exchanger. This lack of monitoring requires that one protect against clogging of the exchanger. Thus, the liquid passage sections in the exchanger are provided to be larger than the size of the biggest impurities that may be contained in the liquid. This is why these passage sections are generally significant.

SUMMARY OF THE INVENTION

The aim of the invention is to propose a heat exchanger system that makes it possible to use, if desired, a heat exchanger with small liquid passage sections, while also doing away with monitoring of the clogging of that exchanger.

To achieve this aim, the object of the invention is a heat exchanger system intended to be passed through by a liquid, comprising a heat exchanger with a liquid inlet and a liquid outlet. The system further comprises a bypass valve with a liquid inlet and a liquid outlet, and a self-cleaning filter with a liquid inlet and two liquid outlets, one being an outlet for filtered liquid and one being an outlet for non-filtered liquid, said outlet for filtered liquid being connected to the inlet of the exchanger and said outlet for non-filtered liquid being connected to the inlet of the valve. The liquid outlet of the exchanger is connected downstream of the outlet of the valve.

The system of the invention therefore comprises a self-cleaning filter connected to the inlet of the exchanger. At the beginning, this filter is passed through by all of the liquid arriving in the system. The inlet of the exchanger is therefore the liquid inlet of the system. The filter catches all of the impurities of a size larger than the weave of the filter. This accumulation of impurities causes fouling of the filter and therefore an increase in the head loss of the filter. When the pressure at the inlet of the bypass valve, which increases, reaches a predefined threshold, the valve opens. This opening keeps the head loss at an acceptable level and allows the total flow of the fluid, via the valve. This flow will drive the impurities caught in the self-cleaning filter, and therefore clean the filter. In parallel, the filtering surface freed from impurities will allow the liquid to pass and therefore decrease the head loss. The valve will gradually close and the filter will resume its normal operation.

Regardless of the position (open or closed) of the bypass valve, the exchanger is always protected from impurities by the filter. There is therefore no longer a risk of clogging of the exchanger such that one can do away with monitoring the clogging thereof. Moreover, in the case of a tube heat exchanger with pins, the aforementioned risk of perforation of the tube is also eliminated.

Furthermore, instead of a tube exchanger, a plate heat exchanger with small passage sections may be used, a plate exchanger generally being less bulky, lighter and higher performing in terms of heat exchange than a tube exchanger.

Lastly, the filter being self-cleaning and the exchanger being protected from impurities, these elements do not need to be cleaned (or replaced) often, or may even never need to be cleaned, which decreases the maintenance costs of the system.

Another object of the invention is a turbomachine fuel circuit comprising the aforementioned heat exchanger system. The invention is intended for all types of turbomachines, land or aeronautic, and more particularly for airplane jet engines.

BRIEF DESCRIPTION OF THE DRAWINGS

The invention and its advantages will be even better understood upon reading the following detailed description. This description refers to the appended figures, in which:

FIG. 2 shows the self-cleaning filter and the bypass valve of one embodiment of a system according to the invention, said valve being in the closed position;

FIG. 3 is a view similar to that of FIG. 2, said valve being in the open position.

DETAILED DESCRIPTION

Figure 1:
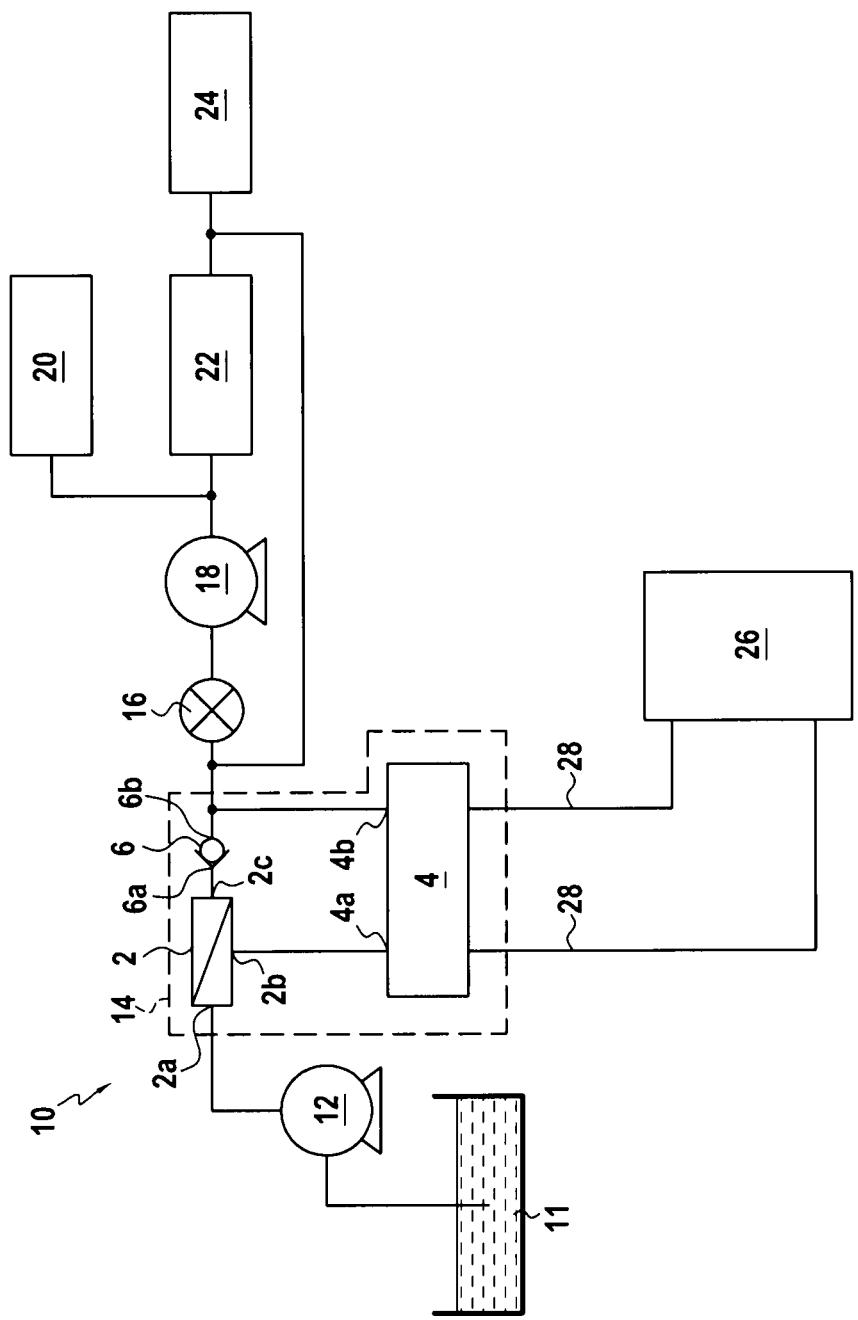
FIG. 1 shows an example of a fuel circuit according to the invention.

FIG. 1 diagrammatically illustrates an example of a fuel circuit 10 for an airplane jet engine.

Upstream and downstream are defined in this application in relation to the normal direction of flow of the liquid (here the fuel) passing through the circuit and the system of the invention.

The circuit 10 comprises, from upstream to downstream: a fuel tank 11 (this is the airplane fuel tank); a low-pressure pump 12 pumping the fuel into said tank 11; a heat exchanger system 14 according to the invention, supplied by the pump 12; a main filter 16; a high-pressure pump 18; a servo-control mechanism 20, supplied with fuel by the pump 18; a fuel regulator 22 supplied by the pump 18, and fuel injectors 24 situated downstream from the regulator 22. These injectors 24 are situated in the combustion chamber of the jet engine.

FIG. 1 also illustrates the oil circuit 28 making it possible to ensure the lubrication of the electricity generator, or IDG 26 of the airplane. The heat exchanger system 14 according to the invention comprises: a self-cleaning filter 2; a heat exchanger 4; and a bypass valve 6.

The heat exchanger 4 is passed through, on one hand, by the fuel from the fuel circuit 10 and, on the other hand, by the oil from the circuit 28. The fuel being at a lower temperature than the oil, during the operation of the jet engine, the heat exchanger 4 makes it possible to cool that oil.

As one can see, the heat exchanger system 14 is situated upstream of the main filter 16 of the circuit 10 and downstream of the low-pressure fuel pump 12 of the circuit 10. The self-cleaning filter 2 has a liquid inlet 2a and two liquid outlets, of which one is an outlet for filtered liquid 2b and one is an outlet for non-filtered liquid 2c.

The inlet 2a is the liquid inlet of the system 14 and all of the liquid passing through the system passes through said inlet 2a. In the example, this inlet is connected to the outlet of the pump 12.

The outlet for filtered liquid 2b is connected to the inlet 4a of the exchanger 4, while the outlet for non-filtered liquid 2c is connected to the inlet 6a of the valve 6. Moreover, the liquid outlet 4b of the exchanger is downstream of the outlet 6b of the valve, such that the liquid coming out of the system 14 comprises the liquid exiting through the outlet 6b of the valve and/or the liquid exiting through the outlet 4b of the system.

FIGS. 2 and 3 show a more detailed example of a self-cleaning filter 2 and bypass valve 6. In this example, the filter 2 comprises a tubular filtering membrane 30 with axis T. For example, the membrane 30 is made of a "plain Dutch weave" type fabric or a "plain reps" type fabric.

The liquid inlet 2a of the filter 2 is situated at one end of said membrane 30. The outlet for non-filtered liquid 2c of the filter 2 is situated at the other end of the membrane 30, the outlet for filtered liquid 2b is situated on the membrane 30 side. The flow of liquid passing through the inlet 2a and withdrawn through said outlet for filtered liquid 2b, shown by the arrows F in FIG. 2, passes through the membrane 30 (following a direction transverse to the axis T) and is therefore filtered by the latter. The flow of liquid passing through the inlet 2a and withdrawn through said outlet for non-filtered liquid 2c, shown by the arrows F in FIG. 3, passes inside said membrane 30 along the axis T.

When the impurities begin to foul the membrane 30, the pressure of the liquid at the outlet for non-filtered liquid 2c increases, up to a certain value after which the bypass valve 6 opens to allow the liquid to pass. A flow of liquid (arrows F') is thus established oriented along the axis T inside the membrane 30. This flow of liquid drives with it the impurities present on the inner surface of said membrane 30 and that were fouling it. The filtering element 30 is thus cleaned of its impurities. The pressure at the outlet for non-filtered liquid 2c then decreases, and the bypass valve 6 closes gradually, until it reaches its original closed position, shown in FIG. 2.

When the valve is in its closed position (see FIG. 2), all of the liquid passing through the inlet 2a is directed toward the heat exchanger 4, via the outlet for filtered liquid 2b.

In a fuel circuit of an airplane jet engine, the weave of the main filter 16 is generally between 32 and 36 microns (μm).

The weave of the self-cleaning filter 2 is, advantageously, between 55 and 75 μm. This weave size makes it possible to filter particles of larger size constituting a danger for the heat exchanger 4, both in terms of wear and clogging. In other words, the particles that the filter 2 allows to pass do not present a risk for the heat exchanger 4. One will note that the self-cleaning filter 2 being situated upstream of the main filter 16, it is logical for the size of its weave to be larger than that of the main filter.

The invention claimed is:

1. A heat exchanger system through which a liquid can flow, comprising:
   a heat exchanger including a liquid inlet and a liquid outlet;
   a bypass valve including a liquid inlet and a liquid outlet; and
   a self-cleaning filter including a filtering membrane, a liquid inlet, and first and second liquid outlets, the first outlet being an outlet for filtered liquid and the second outlet being an outlet for non-filtered liquid, the first outlet for filtered liquid being connected to the inlet of the exchanger and the second outlet for non-filtered liquid being connected to the inlet of the valve, and the outlet of the exchanger being connected downstream of the outlet of the valve,
   wherein the bypass valve is open when a pressure at the second outlet for non-filtered liquid is greater than a predetermined value due to impurities in the filter, the impurities being removed by a flow of liquid when the bypass value us open.

2. The heat exchanger system according to claim 1, wherein the filtering membrane has a tubular shape around an axis, liquid withdrawn through the first outlet for filtered liquid passes through the filtering membrane, and liquid withdrawn through the second outlet for non-filtered liquid passes inside the filtering membrane along the axis.

3. The heat exchanger system according to claim 2, wherein the inlet of the self-cleaning filter is situated at a first end of the filtering membrane, the second outlet for non-filtered liquid is situated at a second end of the filtering membrane, and the first outlet for filtered liquid is situated on a side of the filtering membrane.

4. The heat exchanger system according to claim 1, wherein the heat exchanger is a plate exchanger.

5. A fuel circuit of a turbomachine, the fuel circuit comprising a heat exchanger system according to claim 1.

6. The fuel circuit according to claim 5, wherein the heat exchanger system is situated upstream of a main filter of the circuit.

7. The fuel circuit according to claim 5, wherein the heat exchanger system is situated downstream of a low-pressure fuel pump of the circuit.

8. The fuel circuit according to claim 5, wherein the self-cleaning filter includes a weave between 55 and 75 microns.

9. A turbomachine comprising a fuel circuit according to claim 5.

* * * * *